United States Patent [19]

Takeda et al.

[11] 4,021,606
[45] May 3, 1977

[54] HOLOGRAM APPARATUS

[75] Inventors: Yasutsugu Takeda, Tokorozawa;
Yoshito Tsunoda, Mitaka; Fumio Imagawa, Hachioji; Keiji Kataoka; Kimio Tatsuno, both of Kokubunji, all of Japan

[73] Assignee: Hitachi, Ltd., Japan

[22] Filed: Mar. 27, 1975

[21] Appl. No.: 562,394

[30] Foreign Application Priority Data

Mar. 27, 1974 Japan .............................. 49-33556

[52] U.S. Cl. .................. 358/130; 179/100.3 G; 179/100.3 V; 340/173 LM; 350/3.5; 358/128
[51] Int. Cl.² ...................... G03H 1/30; H04N 5/86
[58] Field of Search ................. 350/3.5; 178/6.7 R, 178/6.7 A, 6.6 DD; 179/100.3 G, 100.3 V; 346/108

[56] References Cited
UNITED STATES PATENTS

| | | |
|---|---|---|
| 3,610,722 | 10/1971 | Bestenreiner et al. ............. 350/3.5 |
| 3,656,827 | 4/1972 | Gamblin et al. .................... 350/3.5 |
| 3,716,286 | 2/1973 | St. John et al. .................... 350/3.5 |
| 3,739,093 | 6/1973 | Kanazawa et al. ................. 350/3.5 |
| 3,746,783 | 7/1973 | Gerritsen et al. .................. 350/3.5 |
| 3,812,496 | 5/1974 | Brooks ............................... 350/3.5 |
| 3,842,197 | 10/1974 | Broussaud et al. ................. 350/3.5 |

Primary Examiner—Ronald J. Stern
Attorney, Agent, or Firm—Craig & Antonelli

[57] ABSTRACT

A hologram apparatus comprises a rotary plane with a plurality of holograms concentrically or spirally arranged thereon, a light emitting source, and at least one photodetector for reading out reconstructed images of the holograms. During rotation of the rotary plane, the optical path of a light beam from the light emitting source is controlled, whereby the reconstructed images from the respective holograms are focused on the photodetector in succession. Some or all of the holograms are substantially oblong, and the long side and the short side of each oblong extend radially about the axis of the rotary plane and substantially orthogonally to the radial direction respectively.

10 Claims, 14 Drawing Figures

HOLOGRAM APPARATUS

BACKGROUND OF THE INVENTION

1. Field of the Invention

This invention relates to a hologram apparatus, and more particularly to a hologram apparatus which stores continuous information at high density and reconstructs information with high precision.

2. Description of the Prior Art

In general, apparatuses for storing and reconstructing continuous information should have a high storage density and a high reconstruction fidelity. Especially in an apparatus which employs voices or pictures as the continuous information, the demand is great because the quanitity of the voice or picture information is enormous. As one type of device to meet to such demand, a video disk is known. On the other hand, packaging devices or systems for pictures and sounds have hitherto widely used devices, such as a VTR (video tape recorder) and an EVR (electronic video recorder), which record the information on a tape. Unlike these devices, the video disk forms a relief in the surface of a disk (made of, for example, a resin) and stores the information by way of pattern of the relief. The disk of this type is greatly advantageous in that, since the operation of taking replicas from a master is possible by simple press techniques used in well-known sound record disks, a mulipicity of disks can be reproduced inexpensively.

The video disks are broadly classified into the bit-by-bit system and the holographic system. According to the former, information of pictures and voices is developed into time serial signals recorded spirally over substantially the entire area of the predetermined disk. In this case, the area on the disk surface occupied by a unit signal is as small as 1 $\mu$m = 1 $\mu$m. A serious technical problem is the manner in which the small areas are correctly traced to read out and reproduce the signals. In other words, it is a problem of tracking. On the other hand, a video disk according to a holographic system is shown, by way of example, in FIG. 1. Referring to the figure, information corresponding to one picture frame is represented by a singel hologram 1. A plurality of the holograms 1 are arranged spirally on a disk 2. While rotating the disk 2, a laser beam 4 from a laser source 3 illuminates the holograms 1 in succession. Reconstructed images 5 from the holograms 1 are picked up by a photodetector, such as camera tube, 6. Electric signals from the photodetector 6 are reproduced by a television monitor 7 in a well-known manner. Shown at 2' is the rotary shaft of the disk 2. In such a construction, the size of the unit hologram is, for example, 1 mm in diameter. The tracking of the holograms by the laser beam involves of problem on precision. The apparatus illustrated in FIG. 1 represents therefore a preferred, simplified construction.

A technical problem in the case of recording the holograms on the disk stated above is how sound signals corresponding to one picture frame are associated with each hologram. In this respect, various expedients have heretofore been proposed. It is a real situation, however, that none of the expedients is effective. An example of the proposals is a system in which, in spirally arranging the holograms of the pictures, a slight spiral interstice is provided between the adjacent hologram arrays in the radial direction, to form sound record grooves in the interstice.

This system is illustrated in FIG. 2. In the figure, a spiral indicated by reference numeral 8 is the sound record groove. With such a system, however, picture information is recorded on the greater part of the entire disk surface, and hence, only a very small amount of voice information can be recorded when the area of the disk is that of an ordinary sound record. This is a grave restriction in practical use.

SUMMARY OF THE INVENTION

An object of this invention is to provide a hologram apparatus which can store continuous information extending over a long period of time.

Another object of this invention is to provide a hologram apparatus which can store voice and picture information on an identical recording medium at high density.

Still another object of this invention is to provide a hologram apparatus which can reconstruct at high precision, picture and voice information stored on the same recording medium.

In order to accomplish such objects, according to this invention, information obtained by sampling information which varies continuously over a long time is recorded into holograms, and the holograms are reconstructed.

Hereunder this invention will be described in detail with reference to the drawing.

BRIEF DESCRIPTION OF THE DRAWING

FIG. 11A is a plan view of relief holograms in this invention, while

DESCRIPTION OF THE PREFERRED EMBODIMENTS

Figure 1:
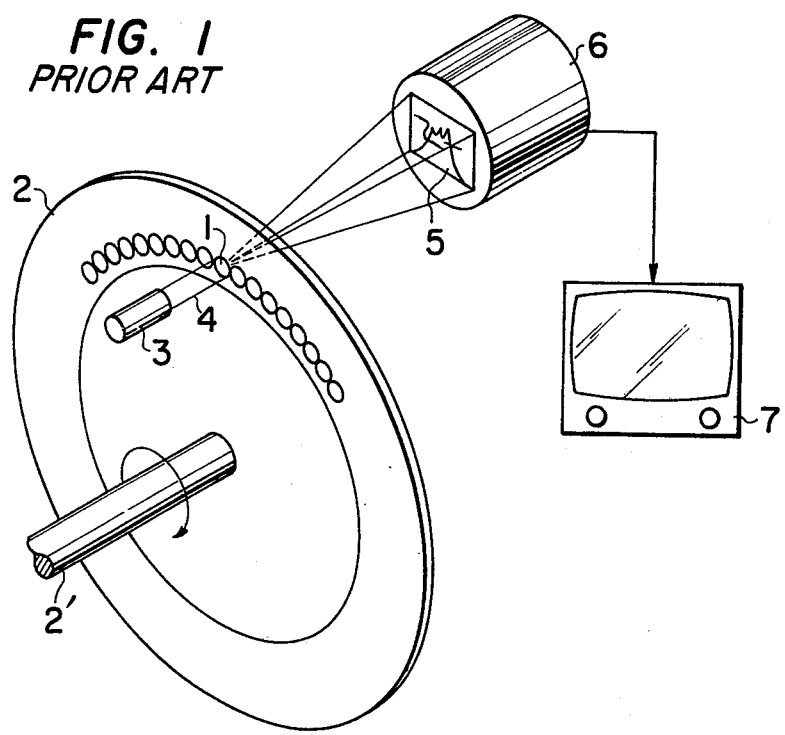
FIG. 1 is a schematic view which shows the construction of a prior-art holographic video disk.
Figure 2:
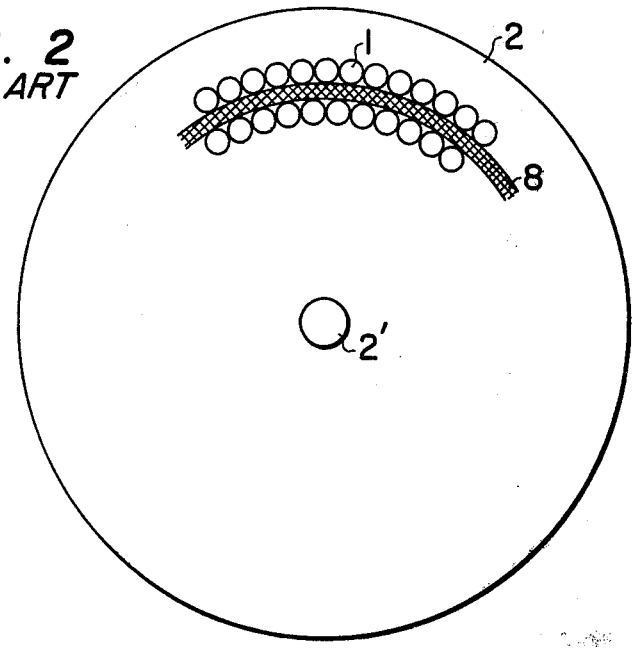
FIG. 2 is a schematic plan view which shows a prior-art disk having a sound record groove and holograms.
Figure 3:
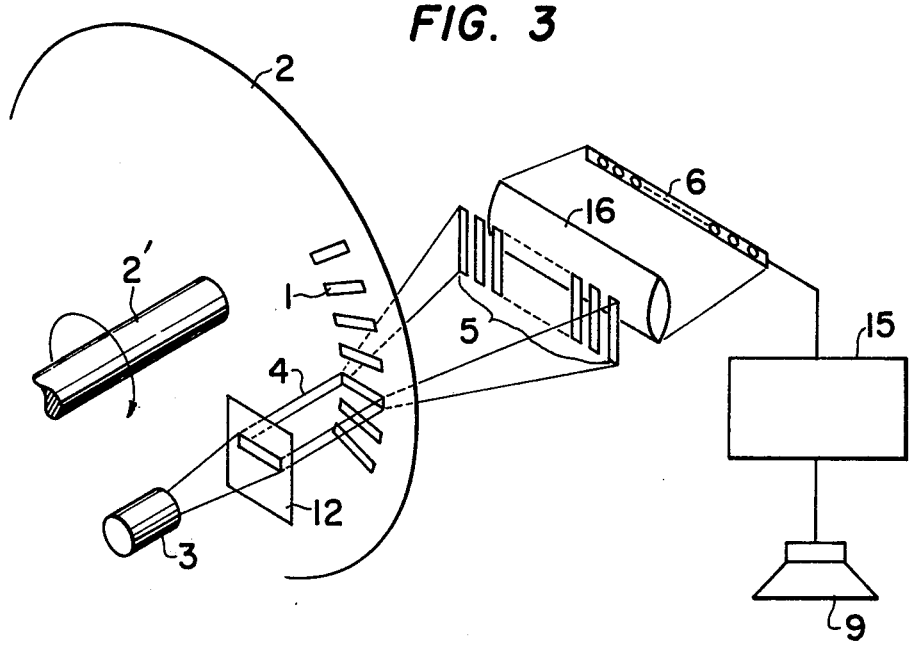
FIG. 3 is a schematic view which shows the fundamental construction of this invention.

For a better understanding of the features of the hologram apparatus according to the invention, description will be made of a case where information (for example, voice signals) varying continuously over a long time is reconstructed from a plurality of holograms. Each of the holograms stores information which is obtained by sampling the information varying continuously over a long period time (for example, signals which are obtained by digitizing voice signals, or signals which represent the signals according to PCM codes). FIG. 3 is a view showing an embodiment of the hologram apparatus which reconstructs, for example, voice signals from such a plurality of holograms. Referring to the figure, numeral 2 designates a disk whose surface is coated with a hologram recording material. A plurality of holograms 1 are formed on the surface. Each of the holograms 1 has a shape which can be substantially regarded as oblong. The holograms are closely arranged in such a manner that the long side of the oblong extends in the radial direction of the disk 2, while the short side extends in a direction substantially orthogonal to the radial direction. A light source 3 is arranged on one side of the disk 2, and generates a laser beam 4. Shown at 12 is a mask having a slit which is arranged between the light source 3 and the disk 2. The size of the slit is approximately equal to that of each hologram 1. Each hologram is, accordingly illuminated by the laser beam 4 through the rectangular slit of mask 12 which is substantially equal in size thereto.

As the disk 2 rotates in the direction of the arrow, each hologram is illuminated by the beam 4 from the slit of mask 12. Sound information corresponding to a predetermined short interval of time equal to the passing period of time is included as code information (for example, PCM code signals, digital signals etc. which are well known in themselves). That is to say, each hologram represents an encoded signal of one or more sampling signals at the time when the voice signals are sampled at a predetermined period of time. A hologram apparatus which records such sampling signals as holograms will be explained below in conjunction with the embodiment shown in FIG. 6. Each holograms 1 is illuminated by the laser beam 4, and the encoded signal 5 of the voice signal is reproduced as a reconstructed image of the hologram. Of course, position of the reconstruction is the focusing position of the hologram behind the disk 2. Since the encoded signal 5 is constructed by "on" and "off" modulation of a light beam as will be discribed below, it is read by means of a photodetector 6 (made up of, for example, a photodiode array). In this case, the encoded signal 5 is condensed on the photodetector 6 through an optical system 16. Output signals from the photodetector 6 become input signals to an information processor 15 (for example, a decoding unit which is constructed of a decoder, low-pass filters etc. as is well known). The encoded signals are decoded by the processor 15 into vocie signals. The voice signals are emitted by a sound reproducing device 9 (for example, a loudspeaker) to appeal to the ear.

Figures 4A, 4B, 4C, 5:
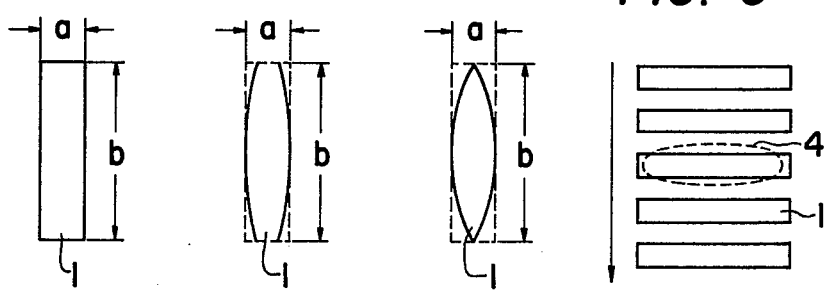
FIGS. 4A, 4B and 4C are diagrams which illustrate the shapes of holograms for use in this invention, respectively.
FIG. 5 illustrates the relationship between the holograms in this invention and a laser beam for illuminating them.

Now the shape of each hologram 1 on the disk 2 which stores the voice signal in the form of the encoded signal will be explained. It is a first feature of this invention that the shape of the hologram 1 is substantially oblong. The shape, however, need not be exactly oblong as shown in FIG. 4A. In may be an circumscribed oblong about an ellipse as shown in FIGS. 4B and 4C. In other words, it may be an ellipse which is inscribed in an oblong (indicated by dotted lines) as shown in FIGS. 4B and 4C. Owing to the fact that the hologram has a substantially oblong shape, high density storage becomes possible, tracking is easy and the influence of mechanical vibrations is avoided. It is therefore, possible to realize a hologram apparatus of practical use ,capable of reproducing vocie signals. For high density storage, the ratio $a/b$ between the short side $a$ and the long side $b$ of the hologram 1 in FIGS. 4A to 4C should be as small as possible, and desirably the ratio is made approxiamtely 1/10 or smaller (by way of example, $a$ is set at 10 $\mu$m and $b$ at 100 $\mu$m). Thus, the quantity of information can be reduced without spoiling the quality of the information (voices). In addition to the first feature of the shape of the hologram 1, this invention has a second feature regarding the arrangement of the respective holograms on the basis of the fact that the hologram 1 is oblong. The second feature is that the long said of the oblong extends in the radial direction of the disk, while the short side extends in a direction substantially orthogonal to the radial direction of the disk (in other words, the short side extends in the scanning direction of the laser beam). With such a arrangement, the period of time during which the laser beam passing through the slit illuminates each hologram can be made very short, and the storage density can be raised. Description will now be made of the storage density of the invention.

Essentially, sound information is time serial information. It is best to handle the sound information by a system which processes ever-changing information as is. To perfectly put the information into a time series is equivalent to carrying out the recording unidimensionally along a spiral. With this measure, however, the problem of tracking as previously stated arises when the storage density is enhanced to the limit of the storage density by light. The limitation on the quantity of information is severe in the prior-art recording system for a sound record.

In the invention, the long side $b$ of the oblong is set at, for example, the extent of the recording groove width of the record (about 100$\mu$m). In addition, the quantity of information corresponding to the limitation on the light recording density is holographically stored in the unit length of the groove width. Since the information storage density of the holographic information recording system is usually $10^5$ bits/mm$^2$ or so, the band of 100 $\mu$m includes $10^2$ bits of information. The information quantity of $10^4$ bits is equal to the information quantity of sounds corresponding ordinarily to one frame in a video package. In this invention, the information quantity of sounds corresponding to one frame is further divided be 100. More specifically, the recording groove having a width of 100 $\mu$m is sectioned every 10 $\mu$m in the lengthwise direction thereof (that is, the short side of the oblong is set at 10 $\mu$m and $10^2$ bits of information are stored as a hologram in an area of 100 $\mu$m $\times$ 10 $\mu$m. This number of bits corresponds to the number of bits of the encoded signal 5 illustrated in FIG. 3. The first reason for such reduction of the information quantity is that conventional photodetectors which can process the information in parallel are technically restricted to approximately $10^2$ bits. The second reason is concerned with the so-called spacial modulator which modulates light in response to information and which transmits information in parallel with a light beam in the spacial sense. In order that, in the case of hologram recording, the operation of the spacial modulator may be equivalent to the operation of a unidimensional shutter array, the information quantity is restricted to the specified extent as an actual matter of fact. The third reason is intrinsic. Assuming that the output of the light source and the reconstruction efficiency of the hologram (the ratio between the laser beam power impinging on the hologram and the laser beam power serving for the reconstruction of the image from the hologram) have fixed values, the power of light incident per bit of the photodetector is inversely proportional to the number of bits of the information which one hologram has. In the case of considering the use of the conventional photodetectors, therefore, the quantity of information must be made below a certain value.

It will now be described how tracking free from the influence by mechanical vibrations or by offset is possible owing to the storage of the encoded signal of voice information as a substantially square hologram, as in the invention. According to the invention, as illustrated in FIG. 5, the relative movement between the holograms 1 and the laser beam 4 (indicated by a dotted line in the figure) illuminating the holograms is in the direction in which the long sides of the substantially oblong holograms ae traversed. Therefore, even when some extent of mechanical vibration and offset arise in the rotation of the disk with the holograms recorded thereon or in the path of the laser beam, it is next to impossible that the laser beam will fall outside the whole area of the hologram. Accordingly, even when a slight deviation occurs, only the brightness of the signal to be reproduced decreases slightly, yet the significance of the code signal is not aduersily affected due to the redundancy which is a great feature of an hologram recording. In FIG. 5, the arrow represents the direction in which the holograms 1 move. In the emobidment illustrated in FIG. 3, such holograms are arranged along a spiral path of about 100 turns with a diameter of 20 cm on the disk 2 having a diameter of 25 cm. Thid. corresponds to 35 minutes in terms of sound reproduction time.

Figure 6:
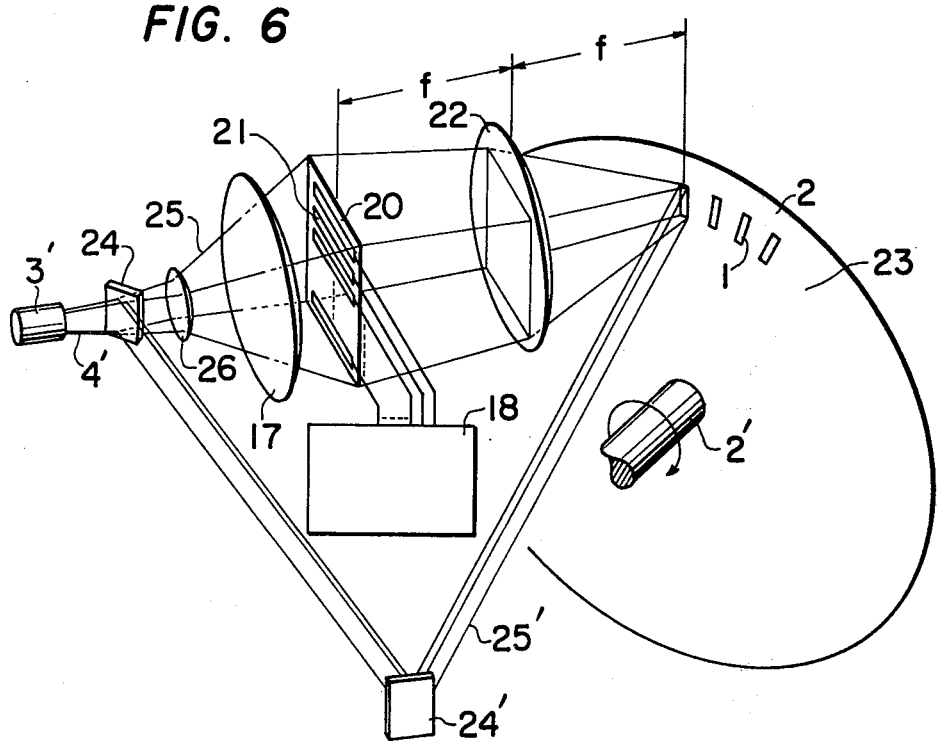
FIG. 6 illustrates an embodiment of the system in which parallel code information is written into substantially oblong, elongate holograms according to the invention.

FIG. 6 shows the construction of an embodiment which serves to record the encoded signals of the voice signals on the disk as substantially oblong holograms described above. Referring to the figure, numeral 20 denotes a electrooptic shutter array, which is composed of a plurality of optical shutters 21. Each of the optical shutters 21 is made by attaching a transparent electrode on to an electrooptic crystal (for example, a gadolinium molybdate crystal) which is substantially oblong. Reference numeral 18 designates a control signal generating source for the electrooptic shutter array 21. The encoded signals which are obtained by encoding the voice signals by a well-known method are generated from the control signal generating source 18 at predetermined time intervals. The method by which the encoded signals control the optical shutter array 20 is well known. The optical shutter 21 to which the encoded signal is applied transmits light, whereas the optical shutter 21 to which the encoded signal is not applied does not transmit light. Therefore, light is modulated in an "on" and "off" fashion in correspondence with the encoded signals impressed on the optical shutter array 20. That is, the respective optical shutters 21 assume an "on" state or an "off" state in dependence on whether the code signal is 1 to 0. Further, in FIG. 6, 3' indicates a laser source, 4' a laser beam emergent from the laser source 3', 24 a beam splitter, 24' a plane mirror, 17 a lens for obtaining a collimated beam, 22 a focusing lens, 23 a recording medium applied onto the disk 2, 25 an object beam, 25' a reference beam, and 26 a beam magnifying lens. The same symbols as in FIG. 3 represent the same or equivalent parts. In operation, the laser beam 4' emitted from the laser source 3' is split by the beam splitter 24 into an object beam 25 and a reference beam 25'. The object beam 25 is magnified by the lens 26, and is formed into a collimated beam by the lens 17. The collimated beam is brought to incidence on the electrooptic shutter array 20. When the object beam 25 passes through the shutter array 20, it is subjected to the on-off control by pulse signals which are code signals obtained by encoding voice signals (PCM code signals) and which are delivered from the control signal generating source 18, and it is converted into an object light beam representative of the voice signals. The object beam having passed through the shutter array 20 is condensed by the lens 22 onto the disk 2 which is coated with the recording material 23 for the hologram recording. To the light focussing part of the disk 2, the reference beam 25', to which a part of the laser beam 4 is divided by means of the beam splitter 24, is directed by the plane mirror 24', so as to be superposed on the object beam 25. Thus, a hologram 1 is formed. In this case, the disk 2 is rotated, as indicated by an arrow in the figure, in synchronism with the generation of the pulse signals from the control signal generating source 18 (a driving device for the rotation is omitted in order to simplify the explanation), and the holograms 1 are successively formed at fixed intervals.

In this way, the encoded signals representative of the voice signals are recorded as the holograms in succession at the predetermined time intervals.

The spacing between the electrooptic shutter array 20 and the lens 22 and the spacing between the lens 22 and the recording material 23 for the hologram recording are equal to the focal length $f$ of the lens 22, respectively. The recording state of the information within the hologram is the Fourier transformation of the distribution of the beam having passed through the electrooptic shutter array 20. It is known that the original pattern for obtaining an oblong pattern by the Fourier transformation is a pattern which is similar to the oblong and which is rotated by 90° with respect to the optical axis. It is for this reason that elongated oblong optical shutters 21 are used in this embodiment. Although it is natural that the information recorded and written as the holograms by the use of the elongated shutter array become elongate images of light upon reconstruction, the use of the elongated shuter array renders the effect of this invention more remarkable. More specifically, a solid-state light sensor of, for example, one dimension, is employed as the photodetector as in the embodiment shown in FIG. 3. Difficulty in bringing the position of the reconstructed image and that of the solid-state sensor into coincidence is sharply reduced owing to the fact that the light image is elongated.

Figure 7:
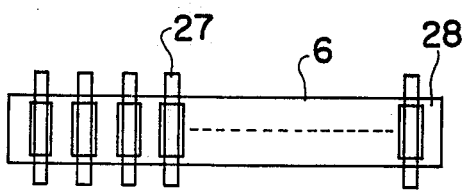
FIG. 7 is a diagram which illustrates the positional relationship between a reconstructed image from a hologram formed according to the invention and a solid-state sensor.

FIG. 7 is a diagram for elucidating this advantage. Since the reconstructed image 27 of the shutter array (in other words, the reconstructed image of the oblong hologram) is elongated the registration in the vertical direction between the solid-state light sensor 28 constituting the photodeterctor 6 and the reconstructed image 27 need not be strict.

Figure 8:
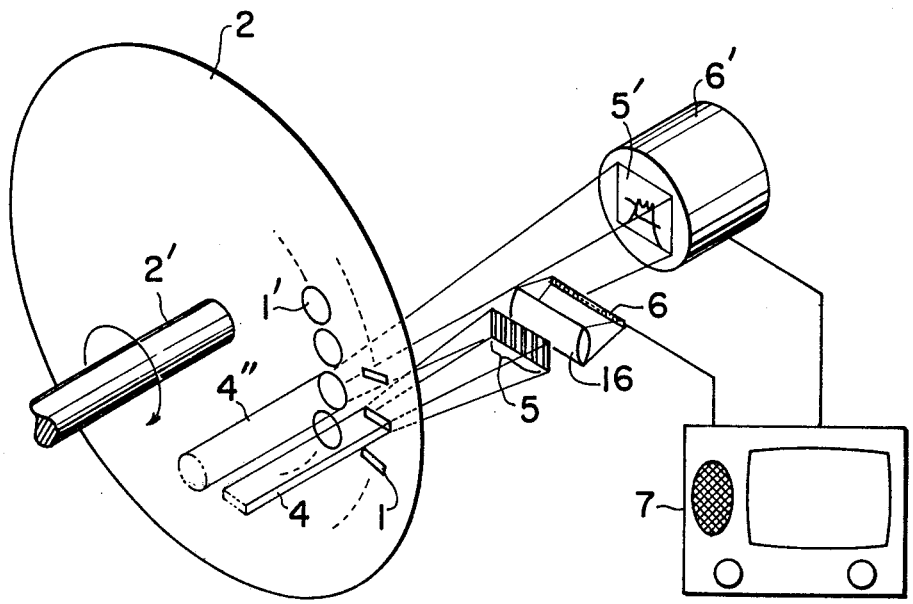
FIG. 8 is a schematic view which illustrates a second embodiment of the invention for recording picture information and voice information on a disk.

FIG. 8 is a view which shows the construction of another embodiment of the invention. It is a hologram apparatus which reconstructs, at the same time, picture information and voice information recorded as holograms. In the figure, the same symbols as in FIG. 3 denote the same or equivalent parts. Two kinds of holograms are recorded on the disk 2. The holograms in one group are substantially circular, while the holograms in the other group are substantially oblong.

These groups of holgrams are arranged spirally and in the direction of the disk 2. Here, 1' designates a circular hologram storing picture information (the recording of such a hologram will be explained in connection with FIG. 9), while 1 designates the aforesaid oblong hologram storing voice information (such a hologram is recorded as has been explained in connection with FIG. 6). 4' indicates a laser beam for illuminating the hologram 1, 5' the reconstructed image of the hologram 1', 6' a photodetector (for example, a well-known camera tube), and 7 a TV monitor. In such a construction, voice and picture information are respecitvely read out by the laser beams 4 and 4" from laser sources (not shown). The reconstruction of the hologram 1 is effected as has been described with reference to FIG. 3. That is, the reconstructed image 5 of the hologram 1 is detected by the photodetector 6, and electric signals (code signals) from the photodetector 6 are decoded into voice signals by an information processor which is contained in the TV monitor 7. On the other hand, the reconstructed image 5' of the hologram 1' is formed on the photodetector 6'. The reconstructed image is converted into video signals by the photodetector 6'. The video signals are reproduced as a television picture by the TV monitor 7 in a well-known manner. In this case, the hologram 1' includes the information of one frame, while the hologram 1 includes sound information corresponding to one video frame in the plurality of holograms contained within a length approximately equal to the diameter of the hologram 1'. Let it be supposed by way of example that the diameter of the substantially circular hologram 1' is 1 mm and that the long side $b$ and the short side $a$ of the substantially oblong hologram 1 are 100 $\mu$m and 10 $\mu$m, respectively, as explained with reference to FIGS. 3 and 4. Then, one hundred holograms 1 can be disposed along the sound track adjacent an individual hologram 1'. In other words, the one hundred holograms 1 include a sound information discreption corresponding to one video frame. Accordingly, when the disk 2 rotates, the one hundred holograms 1 traverse the laser beam 4 during the period during which the hologram 1' traverses the laser beam 4". This is based on the fact that, while the picture information is to be stationary or to slowly move for the eye, the sound information is to rapidly change every moment for the ear. Therefore, the correspondence between the phases of the picture and the sound is definite. Morever, sound information effectively utilize the boundary space between one picture and an adjacent picture, which is remarkably advantageous in that the information storage density is not lowered as a whole.

Figure 9:
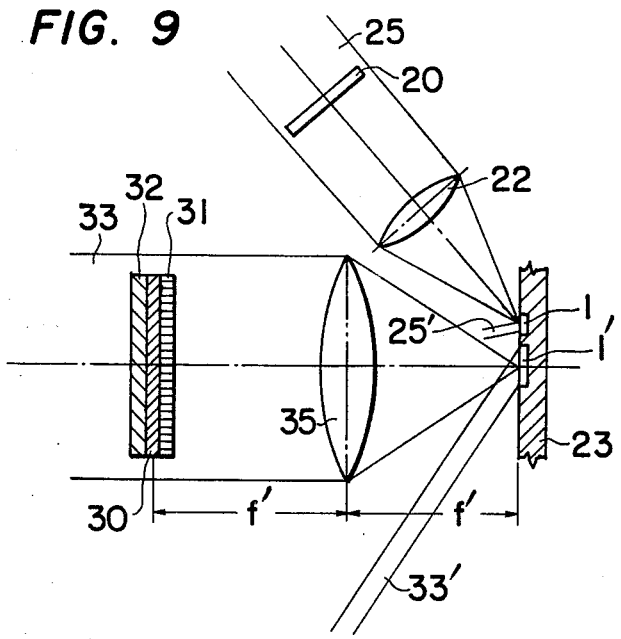
FIG. 9 is a view which pertains to a system of recording holograms in the invention.

FIG. 9 illustrates a recording apparatus for the holograms which can attain such a advantage. In the figure, symbols other than those referred to below have the same significances as in FIGS. 1 to 8. Numeral 30 designates the original information of a picture to be recorded as the hologram 1'. A photographic film is used for the original information in this embodiment of the invention. Numeral 33 denotes a laser beam for illuminating the picture information 30. Numeral 31 indicates a grating which samples effective information from the picture information 30 through circular holes, while numeral 32 indicates a random phase shifter which has been already proposed and preformed in itself and which is known to be remarkably efective for making holograms. Shown at 34 is a lens by which light having passed through the origianl picture information corresponding to one frame is condensed to a circle of a diameter of, for exaple, 1 mm. The spacing between the picture information 30 and the lens 34 and the spacing between the lens 34 and the hologram recording material 23 are each equal to the focal length $f'$ of the lens 34, so that the information beam 33 becomes the Fourier transformation of the original information of the picture on the surface of the recording material 23. It is known that the original pattern from which a circular pattern is obtained by the Fourier transformation is also circular. For this reason, the original information 30 of the picture is sampled by the grating 31 which is made up of a dense of circular holes. 33' in the figure indicates a reference beam into which a part of the laser beam 33 is split by a beam spitter (not shown) and which is directed so as to be superposed upon the information beam 33 on the surface of the hologram recording material. The hologram 1' is formed at the portion of the superposition. The process in which sound information is encoded and in which the encoded signals are stored on the surface of the hologram recording material as the elongated oblong hologram 1 is the same as in the case illustrated in FIG. 6.

Figure 10:
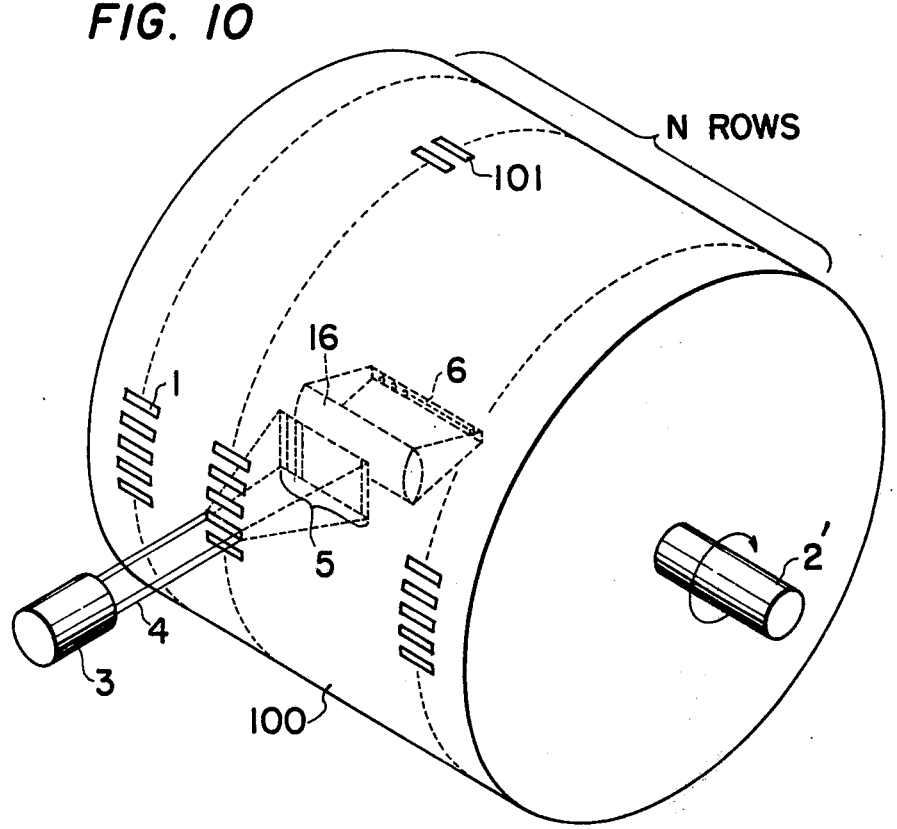
FIG. 10 illustrates the third embodiment of the invention in which holograms are written on a cylinder.

A further embodiment featuring this invention is shown in FIG. 10. The embodiment is a hologram apparatus in which the surface of a cylinder 100 is employed as the rotary surface to store holograms thereon. A group of holograms 101 consists of the substantially oblong holograms 1 which are arranged in the rotating direction of the cylinder, and N rows of such hologram groups 101 are arranged on the surface of the cylinder in the direction of the rotary shaft 2' (concretely, films storing the holograms are disposed). Since the method and apparatus for recording the groups of holograms are the same as in the case previously stated, a detailed explanation thereof is omitted. The holograms may of course be provided, not by disposing the films on the cylinder surface, but by coating the surface of a light transmitting (glass) cylinder with a hologram recording medium and forming them directly on the surface. In order to reconstruct the holograms 101, as shown in FIG. 10, the light source 3 for generating the laser beam 4 is arranged outside the cylinder 100, the photodetector 6 and the optical system 16 for condensing the reconstructed images 5 of the holograms onto the photodetector 6 are arranged inside the cylinder 100, and the respective holograms 1 of the hologram group 101 are illuminated by the laser beam 4 emergent from the laser source 3. Thus, the holograms 101 are succesively reconstructed by rotating the cylinder 100 in the direction of the arrow. The electric signals from the photodetector 6 are reproduced as voices in the same way as in FIG. 3. The electic signals from the photodetector 6 may be derived by lead wires (not shown) which are provided within the rotary shaft 2'. The embodiment illustrated in FIG. 10 has two conspicuous features. The first feature is that the number of holograms of the group of holograms 101 can be made equal in all of the N rows, so that when each group of holograms 101 is to correspond to certain significant information, series of informatin can be taken out at random in dependence on which of the N rows of the holograms are selected. A typical appication of such use consists in a file of voices. By way of example, when the rotational period of the cylinder is set at 20 seconds/revolution and N is set at 1000, it is possible in 20 second of file 1000 kinds of information, each kind having a certain significance, and to reproduce and hear necessary voice information at random. Which row on the cylinder surface is appointed is determined by an external signal input, and the second feature is concerned with this point. Concretely the appointment can be accomplished by a very simple mechanism which moves in parallel with the laser source 3 and the photodetector 6 in the direction of the rotary shaft 2' at an identical speed. The apparatus can therefore be constructed extremely cheaply. Moreover, the access time can be made as short as below about 1 second.

Figure 11A:
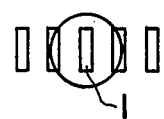
Figure 11B:
FIG. 11B is an expanded sectional view thereof.

The effect of the invention is conspicuously enhanced where the holograms are recorded in a dielectric material, such as plastics, in the form of relief. For example, in the case of the video disk which is shown in FIG. 7 and which stores both pictures and voices as the holograms, a large number of replicas can be formed from a single master by pressing techniques if the holograms are recorded in relief over the entire area of the disk. Although the technique of forming replicas by pressing techniques has, in itself, hitherto been known in selector vision etc., it has not been proposed that the recording of the sound information is simultaneously made as relief holograms. The advantage of the proposal is very remarkable in practical use. FIGS. 11A and 11B illustrate such holograms on enlarged scale. FIG. 11A is a plan view showing the state in which a plurality of substantially oblong holograms 1 are arranged on the disk, while FIG. 11B is a view in which some of the holograms 1 (surrounded by a circle) in FIG. 11A are expanded and represented in section. In FIG. 11B, numeral 34 indicates the relief state of the hologram.

As set forth above, according to this invention, voice information or both picture and voice information can be recorded as holograms at a high storage density and can also be reconstructed with high precision. It is therefore possible to realize an optical video disk device or a voice file device which is especially suitable for a voice and picture packaging system.

Several modifications of this invention can be easily attained. The optical shutter array in the case of the hologram recording is not always restricted to the single array, but two or three arrays may be employed. The holograms recording material is not restricted to the dielectric material, but a silver salt photographic material, dichromate gelatin etc. which are well known in themseleves can also be used. Although the laser is the most appropriate as the hologram reconstructing light source, a semiconductor emitting diode; a white lamp etc. can be used in restricted cases. Further, the hologram recording medium need not be restricted to a disk or a cylinder. In some cases, it is possible to move the hologram reconstructing optical system composed of the light source, the photodetector etc. and to keep the recording medium stationary.

We claim:
1. A hologram apparatus comprising:
a light source;
a hologram recording medium upon which are recorded a series of oblong-shaped holograms, each of which is the hologram of an optical representation of a respective one of a plurality of discontinuous encoded signals, each encoded signal corresponding to a portion of a continuous information signal periodically converted into a series of said discontinuous encoded signals, each discontinuous encoded signal being formed of a plurality of bits corresponding to the value of a respectively converted portion of said continuous information signal;
optical detecting means;
means for causing light from said light source to be sequentially directed upon said series of oblong-shaped holograms and to thereby form a series of reconstructed images of the optical representations of the discontinuous encoded signals, sequentially formed at said optical detecting means, said optical detecting means thereby producing a series of electrical signals representative of said discontinuous encoded signals; and
means, coupled to said optical detecting means, for decoding said series of electrical signals into said continuous information signal, wherein
said continuous information signal is an audio signal and wherein said hologram recording medium further includes a plurality of holograms of video information, with each of which holograms of video information plural ones of said series of oblong-shaped holograms are associated and are disposed adjacent to their associate holograms of video information,
said light directing means includes means for causing light from said light source to be directed upon a respective holograms of video information during the sequential direction of light upon its associated plural ones of said series of oblong-shaped holograms,
said detecting means includes means for detecting a reconstructed image of video information from the holograms of video information during production of said series of electrical signals representative of said discontinuous encoded signals, and
said decoding means includes means for reproducing said video information during the decoding of said series of electrical signals into said audio signal, and wherein
the long side of each oblong-shaped hologram is arranged orthogonal to the direction of sequential direction of light from said light directing means upon said series of oblong-shaped holograms.

2. A holograms apparatus according to claim 1, wherein said holograms recording medium comprises a rotatable cylinder, with said series of oblong-shaped holograms being arranged at the surface of said cylinder in a row traversing the rotational direction of said cylinder, with the long said of each oblong-shpaed hologram being arranged orthogonal to said rotational direction.

3. A hologram apparatus according to claim 2, wherein the surface of said cylinder contains a plurality of series of said oblong-shaped holograms arranged in parallel rows.

4. A holograms apparatus according to claim 1, wherein each hologram of video information is circular, adjacent to which associated plural ones of said series of oblong-shaped holograms are disposed.

5. A hologram apparatus according to claim 4, wherein said recording medium is disc-shaped, upon which said circular holograms and said oblong-shaped holograms are arranged along first and second respective spiral tracks disposed adjacent to one another, with the long side of each of said oblong-shaped holograms being disposed along a radial line of said disc and said spiral tracks being arranged so that, during traverse of a radial line of said disc, said first and second spiral tracks are alternately encountered.

6. A hologram recording comprising a hologram recording medium upon which are recorded a series of oblong-shaped holograms, each of which is the hologram of an optical representation of a respective one of a plurality of discontinuous encoded signals, each encoded signal corresponding to a portion of a continuous information signal periodically converted into a series of said discontinuous encoded signals, each discontinuous encoded signal being formed of a plurality of bits corresponding to the value of a respectively converted portion of said continuous information signal, wherein said continuous information signal is an audio signal and wherein said hologram recording medium further includes a plurality of holograms of video information, with each of which holograms of video information plural ones of said series of oblong-shaped holograms are associated and are disposed adjacent to their associated hologram of video information, and wherein the long side of each side oblong-shaped hologram is arranged orthogonal to the direction along which said series of oblong-shaped holograms are recorded on said hologram recording medium.

7. A hologram recording according to claim 6, wherein said hologram recording medium comprises a rotatable cylinder, with said series of oblong-shaped holograms being arranged at the surface of said cylinder in a row traversing the rotational direction of said cylinder, with the long side of each oblong-shaped hologram being arranged orthogonal to said rotational direction.

8. A hologram recording according to claim 7, wherein the surface of said cylinder contains a plurality of series of said oblong-shaped holograms arranged in parallel rows.

9. A hologram recording according to claim 6, wherein each hologram of video information is circular, adjacent to which associated plural ones of said series of oblong-shaped holograms are disposed.

10. A hologram recording according to claim 9, wherein said recording medium is disc-shaped, upon which said circular holograms and said oblong-shaped holograms are arranged along first and second respective spiral tracks disposed adjacent to one another, with the long side of each of said oblong-shaped holograms being disposed along a radial line of said disc and said spiral tracks being arranged so that, during traverse of a radial line of said disc, said first and second spiral tracks are alternately encountered.

* * * * *